United States Patent [19]
Beakes

[11] Patent Number: 5,596,799
[45] Date of Patent: Jan. 28, 1997

[54] APPARATUS FOR MANUFACTURING ARMATURES

[75] Inventor: John M. Beakes, Fairborn, Ohio

[73] Assignee: Globe Products Inc., Huber Heights, Ohio

[21] Appl. No.: 477,352

[22] Filed: Jun. 7, 1995

Related U.S. Application Data

[62] Division of Ser. No. 267,285, Jun. 28, 1994, Pat. No. 5,500,993, which is a continuation of Ser. No. 234,136, Apr. 28, 1994, abandoned.

[51] Int. Cl.⁶ .................................................. H02K 15/02
[52] U.S. Cl. ..................... 29/733; 29/598; 29/732; 29/759; 198/394; 414/754; 414/780; 414/783
[58] Field of Search .................... 29/281.4, 559, 29/596, 598, 732, 733, 735, 736, 759, 760; 198/394, 401; 414/754, 757, 780, 783

[56] References Cited

U.S. PATENT DOCUMENTS

| | | |
|---|---|---|
| 4,027,375 | 6/1977 | Magni ........................................ 29/282 |
| 4,577,399 | 3/1986 | Ott ............................................ 29/733 |
| 4,710,085 | 12/1987 | Beakes et al. . |
| 4,945,631 | 8/1990 | Banner et al. . |
| 4,956,910 | 9/1990 | Banner et al. . |
| 5,253,912 | 10/1993 | Andorlini et al. ................... 29/732 X |

*Primary Examiner*—Carl E. Hall
*Attorney, Agent, or Firm*—Roger S. Dybvig

[57] ABSTRACT

An armature shaft having a cam body extending from one end thereof is inserted into a shaft-receiving transfer block of an armature lamination and shaft assembly machine so that the cam body has a desired angular orientation relative to the axis of rotation of the armature shaft. A stack of laminations with which the shaft is assembled is rotationally oriented using a rotatable support for the lamination stack and a pair of proximity detectors which sense the position of missing portions of one or more of the laminations.

10 Claims, 3 Drawing Sheets

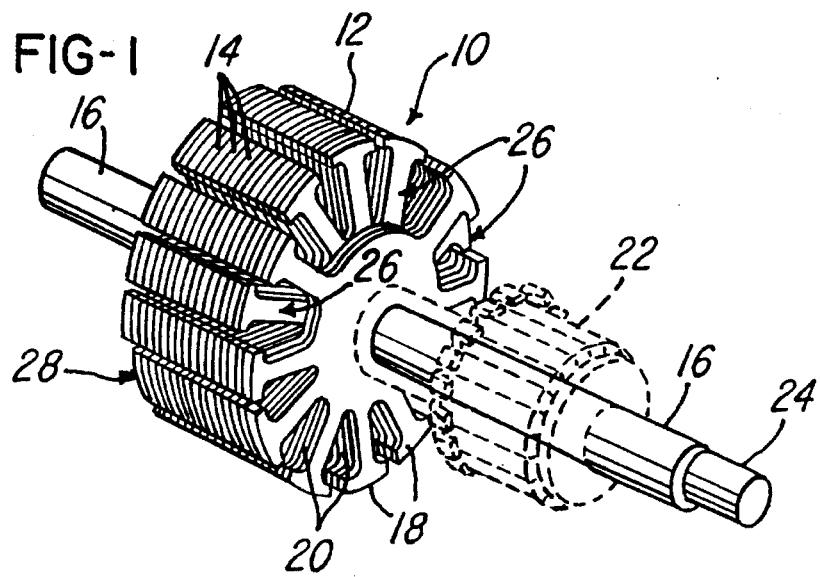
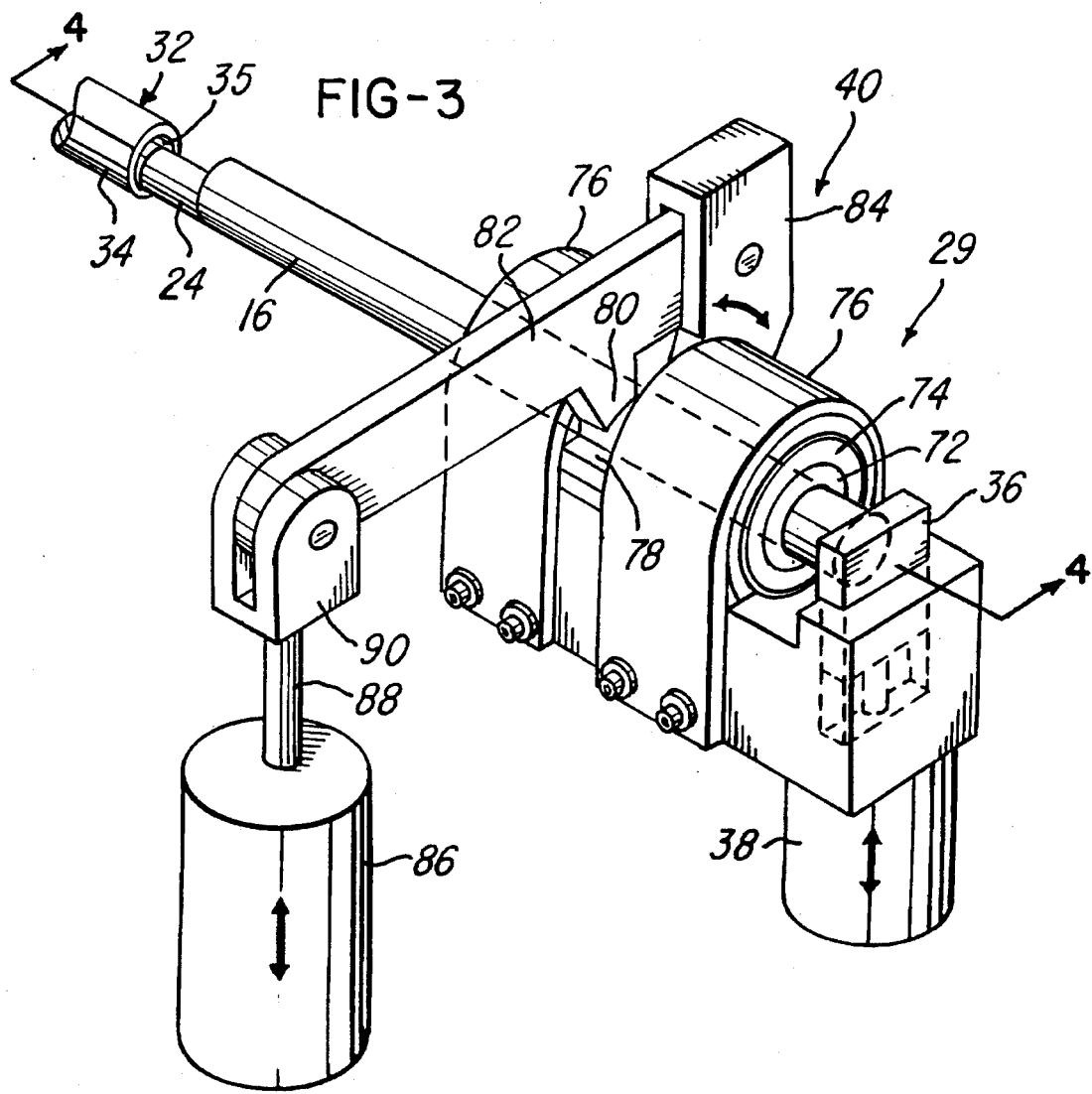

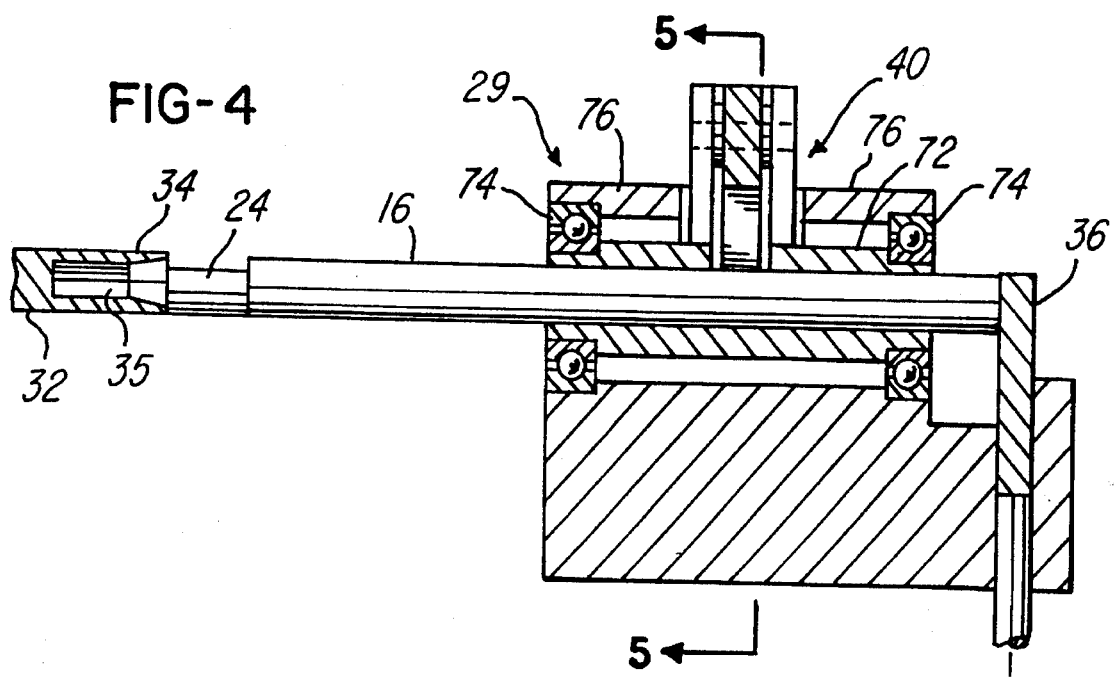
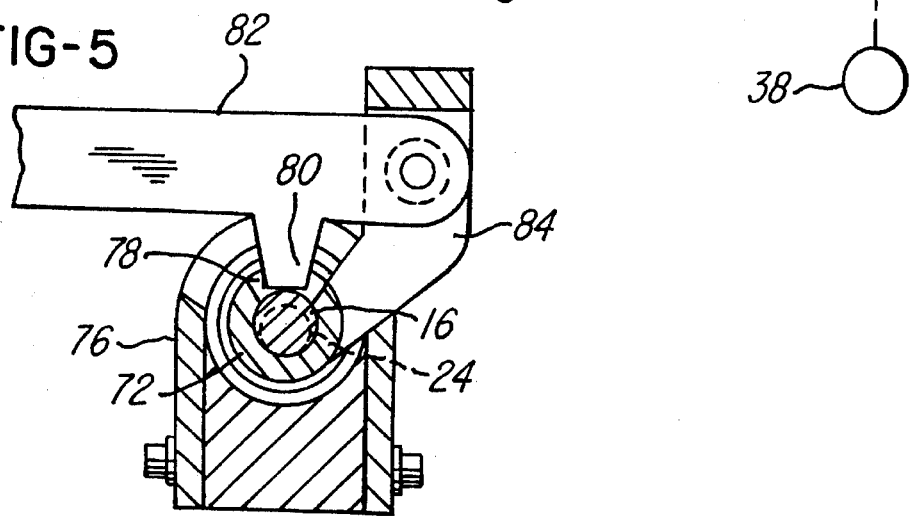
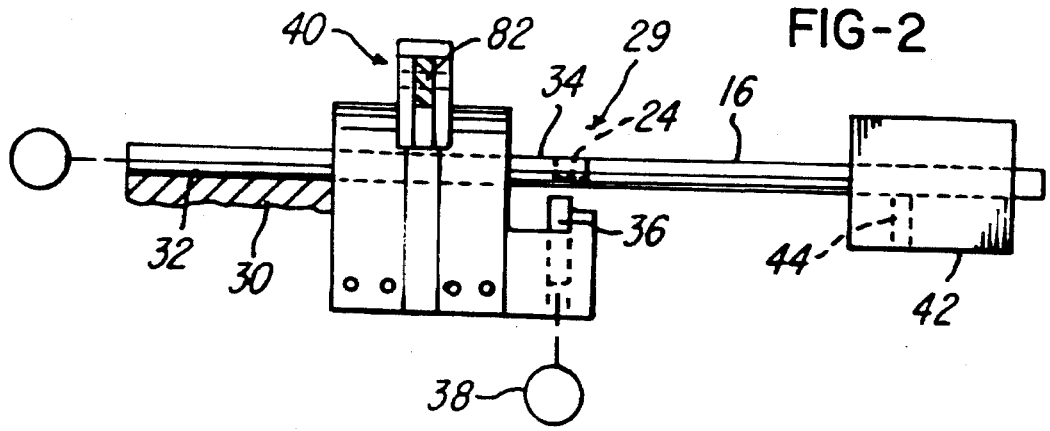

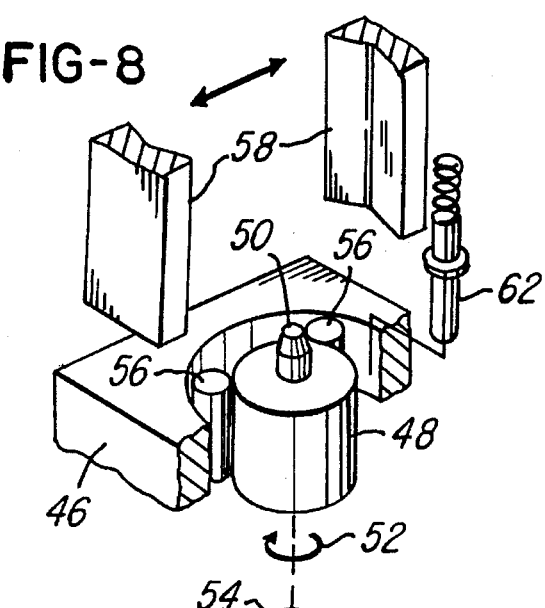
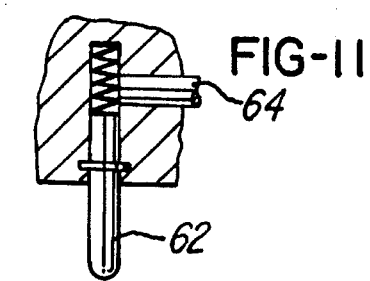
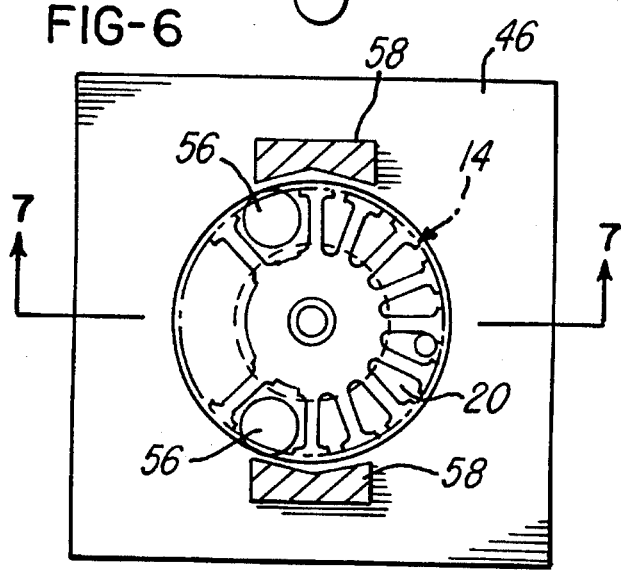
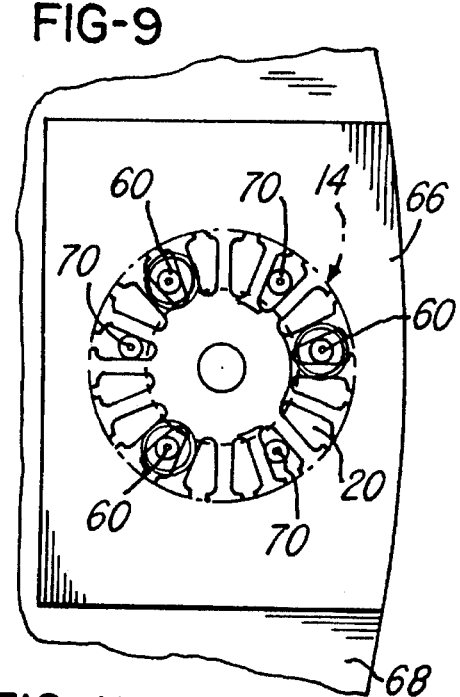
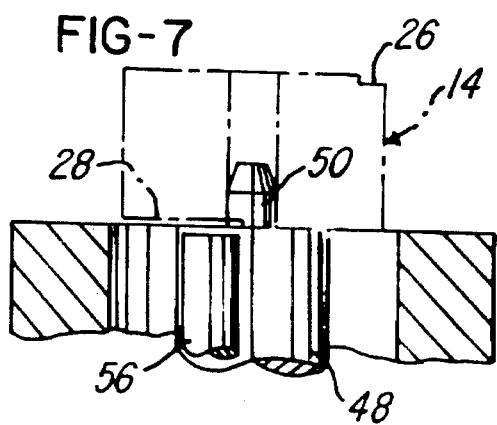
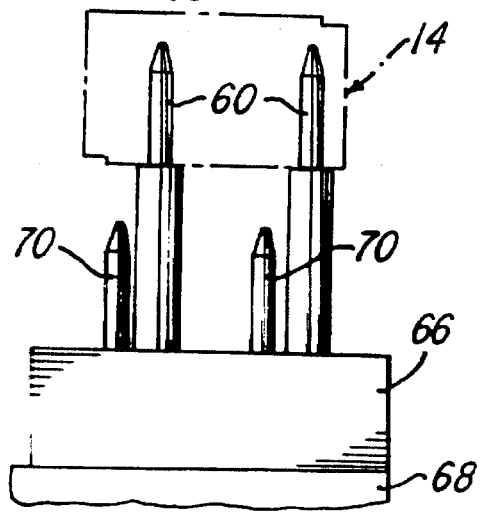

5,596,799

APPARATUS FOR MANUFACTURING ARMATURES

CROSS-REFERENCE TO RELATED APPLICATIONS

This application is a division of application Ser. No. 08/267,285, filed Jun. 28, 1994, of John M. Beakes and E. Wayne Zicht, which is a continuation of application, Ser. No. 08/234,136, filed on Apr. 28, 1994, of John M. Beakes, now abandoned.

FIELD OF THE INVENTION

This invention relates to a method and apparatus for manufacturing armatures, and particularly for rotationally orienting the shaft of an electric motor armature and more particularly an armature shaft having an axially extending cam body integrally formed thereon, and for rotationally orienting a stack of laminations to be assembled on the armature shaft.

BACKGROUND OF THE INVENTION

During the manufacture of an electric motor armature, an armature shaft and lamination assembly machine is used to press an armature shaft into an aperture in the middle of a stack of slotted laminations made from iron or other metal and that form the core of the armature. Armature shafts are normally formed as solid round rods so that there is typically no concern with regard to the rotational position of the armature shaft about its axis. Certain armature shafts have integrally-formed cam bodies extending axially from one of their ends. To assist in balancing such an armature shaft to avoid excessive vibration during use, it can be useful to control the rotational orientation of the armature shaft relative to the rotational orientation of the stack of laminations.

SUMMARY OF THE INVENTION

An object of this invention is to provide a method and apparatus for rotationally orienting an armature shaft having a cam body extending from one end thereof preparatory to the assembling the armature shaft with a stack of laminations.

A further object of this invention is to provide a method and an apparatus for rotationally orienting a stack of laminations.

In accordance with this invention, an armature shaft having a cam body extending from one end thereof is inserted into a shaft-receiving transfer block of an armature lamination and shaft assembly machine so that the cam body has a desired angular orientation relative to the axis of rotation of the armature shaft. (As used herein, the phrase "axis of rotation" in reference to the armature shaft refers to the axis about which the armature shaft rotates after it is assembled into a completed motor.) Apparatus in accordance with this invention includes a powered ram movable along a predetermined axis, the ram having a nosepiece provided with a socket having a size and shape to slidably receive the cam body and located relative to the predetermined axis of movement of the ram in the same rotational orientation as the desired orientation of the cam body relative to the axis of rotation of the armature shaft. A movable abutment is located in confronting alignment with the ram and an armature shaft support is provided that supports the armature shaft so that its axis of rotation is aligned with the axis of ram movement. The ram is actuatable so that the nosepiece presses on one end of said armature shaft to extend its opposite end into engagement with the abutment. A shaft rotation mechanism rotates the shaft while it is pressed between the nosepiece and the abutment in order to align the cam body with the socket while maintaining pressure on the ends of said armature shaft.

The shaft rotation mechanism preferably includes a hollow transfer tube between the ram nosepiece and the abutment into which the shaft is inserted when the ram is actuated to extend the shaft into engagement with the abutment. The transfer tube has a wall provided with a slot opening to the hollow interior of the tube. The shaft rotation mechanism preferably further includes a rotationally driven clamp mechanism having a movable clamp jaw located within the slot that engages the portion of the shaft exposed by the slot and that compressively clamps the shaft to the tube. An actuator repeatedly rotates the movable clamp jaw and thereby the shaft until the desired alignment is achieved.

In the method of this invention, a shaft is deposited on a support located adjacent the ram, the abutment is moved into confronting relation to the nosepiece, and the ram is actuated so that the nosepiece presses on one end of the armature shaft to extend the opposite end thereof into engagement with the abutment. While maintaining pressure on the ends of the armature shaft, the armature shaft is rotated until the cam body is rotationally aligned with the socket in the ram nosepiece whereupon the ram nosepiece slides over the cam body. Thereafter, the abutment can be moved out of confronting alignment with the ram and the shaft inserted into the transfer block.

Further in accordance with this invention, a method and apparatus are provided for rotationally orienting a stack of laminations wherein a support for the stack is slowly rotated to locate selected circumferential parts of the laminations in alignment with proximity detectors for rotationally orienting the stack of lamination.

Other objects and advantages will become apparent from the following description and the drawings.

BRIEF DESCRIPTION OF THE DRAWINGS

FIG. 1 is a perspective view of an armature core assembly which includes an armature shaft of the type with which this invention may be used.

FIG. 2 is a simplified, diagrammatic front elevational view of an apparatus in accordance with this invention.

FIG. 3 is a simplified perspective view, with parts broken away, of a portion of the apparatus of FIG. 2.

FIG. 4 is a partially diagrammatic, cross-sectional view, with parts broken away, of a portion of the apparatus of FIG. 3 taken along line 4—4 thereof.

FIG. 5 is a cross-sectional view, with parts broken away, of a portion of the apparatus of FIG. 4 taken along line 5—5 thereof.

FIG. 6 is a plan view of a lamination stack orienting mechanism in accordance with this invention, and shows, in cross section, parts of a pick and place mechanism for removing stacks of laminations therefrom.

FIG. 7 is a fragmentary cross sectional view of the lamination stack orienting mechanism of FIG. 6 taken along line 7—7 thereof.

FIG. 8 is a fragmentary perspective view, with parts broken away, of the mechanisms of FIGS. 6 and 7.

FIG. 9 is a fragmentary top plan view of a turntable and a nest of an armature shaft and lamination assembly machine with which this invention is used.

FIG. 10 is a fragmentary side elevational view of the turntable and the nest shown in FIG. 9.

FIG. 11 is a cross sectional view of a portion of the pick and place mechanism shown in FIGS. 6 and 8.

DETAILED DESCRIPTION

FIG. 1 illustrates a partially manufactured electric motor armature, generally designated 10, having a core 12 made from a stack of slotted laminations 14 made from iron or other metal assembled on an armature shaft 16. Each of the laminations has plural teeth 18 separated by coil-receiving slots 20. At a later stages of manufacture, so called "end fibers" or end laminations (not shown) made from an insulating plastic material and a commutator shown by phantom lines 22, are also pressed on the shaft 16. The particular shaft 16 has a cam body 24 extending from its end adjacent the commutator 22. The cam body 24 is offset from the axis of rotation of the armature shaft 16, which axis is coincident with the center axis of the core 12. In operation of the completed armature (not shown), the offset location of the cam body 24 creates a balance problem. This problem can be partly alleviated by forming one or more of the metal laminations 14 nearest the commutator to asymmetrical shapes such that radially outermost parts of several of the teeth 18 thereof are removed or missing. The incomplete teeth are generally diametrically opposite the cam body 20, thus leaving gaps 26 in the end laminations. There may also be one or more laminations on the opposite end of the core 12 which are incomplete, as shown by gaps 28.

During manufacture of the armature assembly 10, it is necessary to obtain and maintain a particular angular orientation of the shaft 16 relative to the core 12. With reference to FIGS. 3, 4 and 5, apparatus for this purpose in accordance with this invention is generally designated 29 and includes a support 30 onto which shaft 16 can be deposited by means of known delivery chute and escapement assemblies (not shown), an air or other power actuated ram assembly 32 including a nosepiece 34 provided with a socket 35 having a size and shape to slidably receive the cam body 24 and located relative the same rotational orientation as the desired orientation of the cam body 24 relative to the axis of rotation of the armature shaft. A plate-like abutment 36 is movable into and out of confronting alignment with the ram by means of an air actuator 38.

In operation of the apparatus 29, the abutment 36 is positioned in alignment with the axis of the ram 32 and the ram 32 is actuated whereupon its nosepiece 34 presses on the near end of the armature shaft 16 so that the opposite end thereof is extended into engagement with the abutment 36. A shaft rotating mechanism, generally designated 40, the construction and operation of which will be further described below, rotates the shaft 16 while it remains pressed between the nosepiece 34 and the abutment 36 in order to align the cam body 24 with the socket 35. When the proper orientation of the shaft 16 is obtained, the socket 35 will slide over the cam body 22. This motion is sensed by a suitable sensor, such as a proximity switch (not shown) and the machine controls (also not shown) deenergize the ram 32 and energize the abutment actuator 38 to move the abutment 36 out of alignment with the ram 32. With the abutment 36 out of the way, the ram 32 is energized to push the shaft 16 into the bore of a shaft transfer block 42 which, as conventional, may have plural spring detents, only one of which, indicated by hidden lines 44, is shown. The spring detents 44 maintain the angular alignment of the shaft 16 obtained by operation of the shaft rotating mechanism 40. As those familiar with the art are aware, the transfer block 42 is rotated and translated by a mechanism (not shown), which may be entirely conventional, to bring the shaft 16 to a vertical orientation over the stack of laminations 14 that form the core 12, the stack being located in a predetermined angular position on a supporting nest 46 on a turntable 48 (FIG. 8).

With reference to FIGS. 3, 4 and 5, the shaft rotating mechanism includes a hollow transfer tube 72 rotatably mounted on bearings 74 held within housing members 76 between the ram nosepiece 34 and the abutment 36 into which the shaft 16 is inserted when the ram 32 is actuated to extend the shaft 16 into engagement with said abutment 36. The transfer tube 72 has a slot 78 opening to the hollow interior thereof. The shaft 16 and the tube 72 are rotatably indexed by means of a movable clamp jaw 80 located within the slot 78. Jaw 80 is part of a clamp lever 82 that has one end pivotally mounted on a bracket 84 connected to the transfer tube 72. An air actuator 86 fixed to the machine bed (not shown) has a piston rod 88 connected by a clevis 90 to the other, free end of the clamp lever 82. When the air actuator 86 begins to pull the free end of the lever 82 downwardly, the clamp jaw 80 engages the exposed portion of the shaft 16 and clamps it to the transfer tube 72. Upon continued downward movement of the free end of the clamp lever 82, the transfer tube 72 and the shaft 16 are rotated. As soon as the cam body 24 is aligned with the socket 35, the socket 35 slidably receives the clamp body 24 whereupon the ram 32 moves toward the abutment 36. This motion is sensed by a suitable sensing switch (not shown) and the ram actuator is deenergized. After the ram actuator is deenergized, the abutment 36 is retracted and the ram again energized to insert the shaft 16 into the transfer block 42. The parts thereby reach the position thereof shown in FIG. 2. If the initial rotation of the shaft 16 is insufficient to align the cam body 24 with the socket 35, the actuator 86 is energized to move the free end of the clamp lever 82 upwardly. This releases the clamping pressure between the shaft 16 and the transfer tube 72 and reversely rotates the transfer tube 72. The shaft 16 does not reversely rotate with the transfer tube 72 because it continues to be held under pressure by the ram 32. The clamping of the shaft to the tube and the rotation of the tube and the shaft are then repeated until the cam body is aligned with the socket 35 as described above.

With reference to FIGS. 6 through 11, a predetermined rotary alignment of the stack of laminations 14 is obtained by positioning, as by a conventional pick and place mechanism (not shown), the stack on top of a cylindrical, rotatable support member 48, having a central alignment hub 50 on which the stack of laminations 14 is centered. The support member 48 is slowly rotated, as indicated by arrow 52 in FIG. 8, by a stepping motor 54 until both ones of a mutually-spaced pair of magnetic proximity detectors 56 sense that there is missing lamination material—which indicates that the extreme ends of the gaps 28 are aligned therewith. Upon sensing this orientation of the stack of laminations 14, the stepping motor 52 stops operating and a pick and place mechanism, which includes a pair of clamp jaws 58, picks the stack up from the support 48 and places it onto the shoulders of three conventional stack-lowering pins 60, as illustrated in FIGS. 9 and 10. Proper orientation of the stack of laminations 14 can be verified by a spring-biased locating pin 62 shown in FIGS. 8 and 11, that is constructed and located to enter one of the slots 20 in the stack of laminations 14 when the stack is properly oriented.

If the locating pin 62 strikes a lamination 14 as the stack is being picked up by the clamp jaws 58, a sensing switch 64 is actuated to interrupt operation of the machine so that the problem can be addressed.

FIGS. 9 and 10 show a typical lamination-receiving nest 66 at a load station of a turntable 68 onto which the stack-lowering pins 60 deposit the stack of laminations 14. The shaft-lowering pins 60 lower completely through the turntable 68 so as not to interfere with its rotation. As they lower, the stack is lowered over three alignment pins 70 projecting upwardly from nest 66 so that the desired angular orientation of the stack is maintained. The entire turntable is not illustrated herein, but typically will index until the nest of laminations 14 is brought into alignment with the armature shaft 16 held in vertical orientation by the transfer block 42. The shaft 16 can then be temporarily pressed by operation of an overhead air actuator (not shown) into the stack of laminations on the nest 66. Thereafter, the turntable 68 is indexed to position the nest 66 with the lamination stack and the shaft 16 in a pressing station at which the shaft 16 is fully inserted into the lamination stack.

Although the presently preferred embodiment of this invention has been described, it will be understood that within the purview of the invention various changes may be made within the scope of the following claims.

Having thus described my invention, I claim:

1. Apparatus for rotationally orienting a stack of laminations for an electric motor armature, a circumferential portion of the laminations at one end of the stack lacking radially outermost portions that other laminations in said stack have, said apparatus comprising a support for said stack, means for rotating said support, and proximity detectors for detecting the position of said circumferential portion to interrupt operation of said rotating means.

2. An apparatus for positioning a stack of laminations for an electric motor in a predetermined rotary alignment, each of said laminations having a plurality of radially-extending teeth, at least one of said laminations lacking the radially outermost portion of at least one tooth thereby forming at least one gap in said at least one of said laminations, said apparatus comprising:

a support member for supporting said stack;

means for rotating said support member;

a detector located adjacent said support member and capable of detecting said at least one gap; and means responsive to said detector for interrupting said rotating means when said at least one gap is detected by said detector.

3. The apparatus of claim 2 wherein said support member includes a hub on which said stack is centered.

4. The apparatus of claim 2 wherein said detector comprises a pair of magnetic proximity detectors.

5. The apparatus of claim 2 wherein said responsive means is responsive to both said first detector and said second detector and interrupts said rotating means when both said first detector detects and said second detector simultaneously detect a gap.

6. The apparatus of claim 5 and wherein said first and second detectors comprise a mutually-spaced pair of magnetic proximity detectors.

7. An apparatus for positioning a stack of laminations for an electric motor in a predetermined rotary alignment, each of said laminations having a plurality of radially-extending teeth, at least one of said laminations lacking the radially outermost portion of at least one tooth thereby forming at least one gap in said at least one of said laminations, said apparatus comprising:

means for rotating said stack of laminations;

means for interrupting said rotating means including a detector located adjacent said stack and capable of detecting said at least one gap.

8. The apparatus of claim 7 wherein said detector comprises a magnetic proximity detector.

9. The apparatus of claim 7 wherein said stack of laminations has plural gaps, wherein said detector comprises a first detector capable of detecting one of said gaps and a second detector capable of detecting one of said gaps, and wherein said interrupting means interrupts rotation of said rotating means when said first detector detects one of said gaps and said second detector simultaneously detects another of said gaps.

10. The apparatus of claim 9 and wherein said first and second detectors comprise a mutually-spaced pair of magnetic proximity detectors.

* * * * *